United States Patent
Takayama

(10) Patent No.: US 6,580,576 B1
(45) Date of Patent: Jun. 17, 2003

(54) TAPE DRIVING APPARATUS AND RECORDING MEDIUM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/459,267

(22) Filed: Dec. 10, 1999

(30) Foreign Application Priority Data

Dec. 11, 1998 (JP) .......................................... 10-353389

(51) Int. Cl.⁷ ............................................... G11B 19/02
(52) U.S. Cl. ..................... 360/69; 360/72.2; 360/73.04; 360/74.01
(58) Field of Search .............................. 360/72.2, 73.04, 360/74.1, 69

(56) References Cited

U.S. PATENT DOCUMENTS 6,307,700 B1 * 10/2001 Takayama .................. 360/72.2

* cited by examiner

Primary Examiner—David Hudspeth
Assistant Examiner—Mitchell Slavitt
(74) Attorney, Agent, or Firm—Jay H. Maioli

(57) ABSTRACT

A tape drive apparatus, wherein when receiving eject commands from a host computer, judgement of the content of load point enable flag is made, and in the case where the load point enable flag is, for example, "1", that is, the load point is effective, search of a device area or optional device area just before a partition specified by the load point is started. When reaching a desired device area, necessary unloading processing is carried out, and ejection of a tape cassette is carried out. Thus, unloading is realized at a specified position.

6 Claims, 18 Drawing Sheets

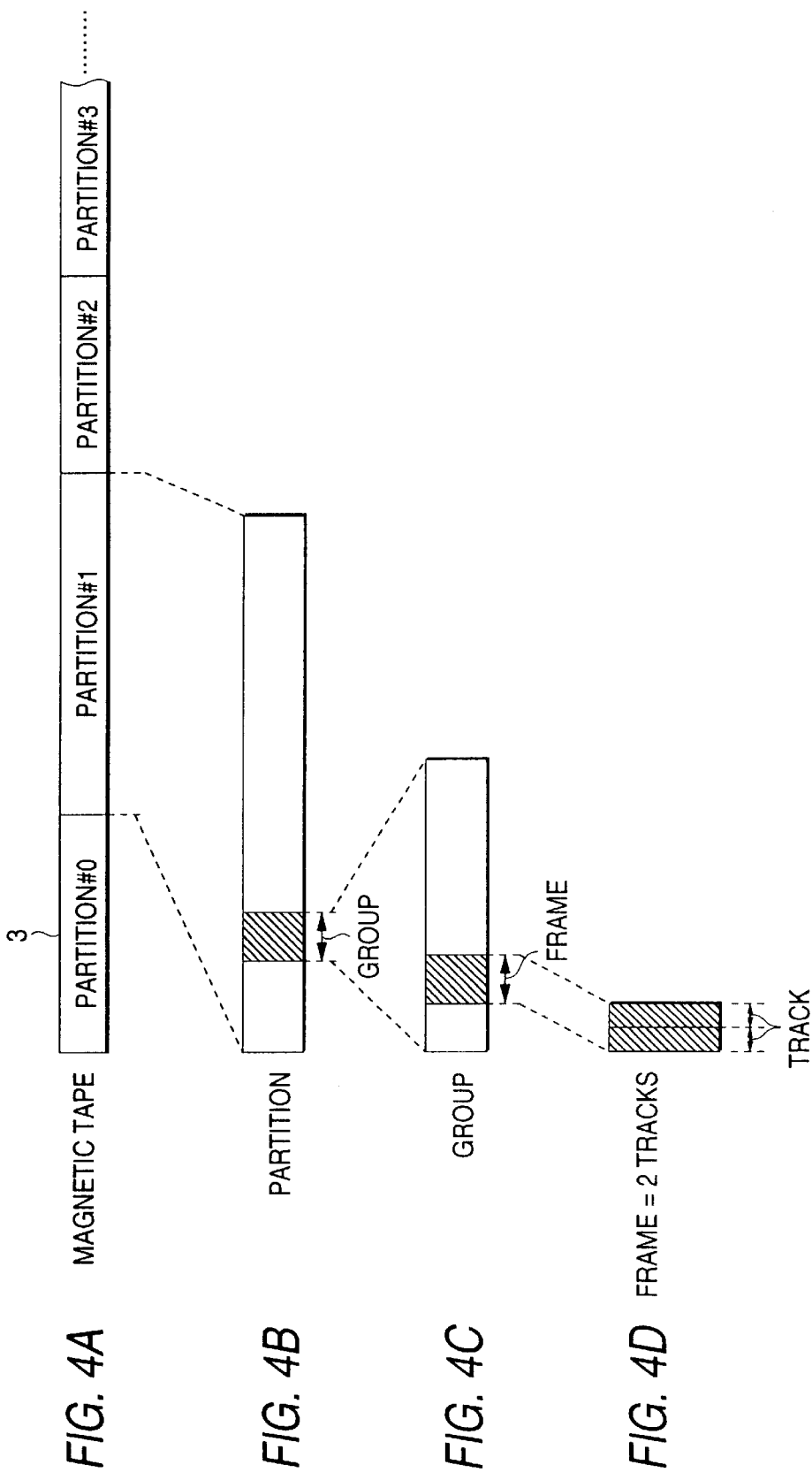
FIG. 4A MAGNETIC TAPE
FIG. 4B PARTITION
FIG. 4C GROUP
FIG. 4D FRAME = 2 TRACKS

| 0 | 1 | 2 | 3 | ................ | 382 | 383 |

FIG. 9

| | | |
|---|---|---|
| RAW FORMAT ID | | 16 BITS |
| LOGICAL FORMAT ID | | 8 BITS |
| LOGICAL FRAME ID | LAST FRAME ID | 1 BIT |
| | ECC FRAME ID | 1 BIT |
| | LOGICAL FRAME NUMBER | 6 BITS |
| PARTITION ID | | 16 BITS |
| AREA ID | | 4 BITS |
| DATA ID | | 4 BITS |
| N-POSITION | | 4 BITS |
| N-REPEATS | | 4 BITS |
| GROUP COUNT | | 24 BITS |
| FILE-MARK COUNT | | 32 BITS |
| SAVE-SET MARK COUNT | | 32 BITS |
| RECORD COUNT | | 32 BITS |
| ABSOLUTE FRAME COUNT | | 24 BITS |
| RESERVED | | |

FIG. 10

| BIT 3210 | DEFINITION |
|---|---|
| 0000 (0) | DEVICE AREA |
| 0001 (1) | REFERENCE AREA |
| 0010 (2) | SYSTEM AREA |
| 0011 (3) | RESERVED |
| 0100 (4) | DATA AREA |
| 0101 (5) | EOD AREA |
| 0110 (6) | RESERVED |
| 0111 (7) | OPTIONAL DEVICE AREA |

FIG. 12

| | | |
|---|---|---|
| MANUFACTURE INFORMATION (FL1) | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES |
| | MAXIMUM WRITE CYCLE | 1 BYTE |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

| | |
|---|---|
| DRIVE INITIALIZE PART CHECKSUM | 1 BYTE |
| MIC LOGICAL FORMAT TYPE | 1 BYTE |
| ABSOLUTE VOLUME MAP POINTER | 2 BYTES |
| USER VOLUME NOTE CELL POINTER | 2 BYTES |
| USER PARTITION NOTE CELL POINTER | 2 BYTES |
| PARTITION INFORMATION CELL POINTER | 2 BYTES |
| RESERVED | 1 BYTE |
| VOLUME ATTRIBUTE FLAGS | 1 BYTE |
| FREE POOL TOP ADDRESS | 2 BYTES |
| FREE POOL BOTTOM ADDRESS | 2 BYTES |

MEMORY MANAGEMENT INFORMATION (FL2)

FIG. 14

| | | |
|---|---|---|
| FL31 | VOLUME INFORMATION CHECKSUM | 1 BYTE |
| | VOLUME INFORMATION | 100 BYTES |
| VOLUME TAG (FL3) | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG. 15A

VOLUME INFORMATION

| | |
|---|---|
| VOLUME INFORMATION CHECKSUM | 1 BYTE |
| EJECT STATUS | 20 BYTES |
| REEL DIAMETER | 4 BYTES |
| RESERVED | 1 BYTE |
| INITIALIZE COUNT | 3 BYTES |
| VOLUME INFORMATION ON TAPE | 72 BYTES |

VOLUME/INFORMATION/ON TAPE

| | | |
|---|---|---|
| RESERVED | | 4 BYTES |
| RESERVED | | 1 BYTE |
| LOAD POINT | | 1 BYTE |
| RESERVED | b6, b7, b8 | 3 BITS |
| SUPER HIGH SPEED SEARCH ENABLE FLAG | b5 | 1 BIT |
| SYSTEM LOG ALLOCATION FLAGS | b3, b4 | 2 BITS |
| LOAD POINT ENABLE FLAG | b2 | 1 BIT |
| AIT NATIVE FLAG | b1 | 1 BIT |
| LAST VALID PARTITION NUMBER | | 1 BYTE |
| OPTIONAL DEVICE AREA ALLOCATION MAP | | 32 BYTES |
| RESERVED | | 32 BYTES |

FL311a
FL312a

FL311 (72 BYTES)

FIG. 16A

| EJECT STATUS | RESERVED | 1 BYTE |
| --- | --- | --- |
| | ABSOLUTE FRAME COUNT | 3 BYTES |
| | PARTITION ID | 1 BYTE |
| | GROUP COUNT | 3 BYTES |
| | RECORD COUNT | 4 BYTES |
| | SAVE SET MARK COUNT | 4 BYTES |
| | FILE MARK COUNT | 4 BYTES |

20 BYTES

FIG. 16B

| REEL DIAMETER | SUPPLY REEL INTEGER PART | 1 BYTE |
| --- | --- | --- |
| | SUPPLY REEL FRACTION PART | 1 BYTE |
| | TAKE UP REEL INTEGER PART | 1 BYTE |
| | TAKE UP REEL FRACTION PART | 1 BYTE |

4 BYTES

FIG. 17A

CELL STRUCTURE

| LINK INFORMATION | 8 BYTES |
|---|---|
| DATA | (n) BYTES |

FIG. 17B

LINK INFORMATION

| CELL CHECKSUM | 1 BYTE |
|---|---|
| RESERVED | 1 BYTE |
| CELL SIZE | 2 BYTES |
| PREVIOUS CELL POINTER | 2 BYTES |
| NEXT CELL POINTER | 2 BYTES |

8 BYTES

FIG. 18

PARTITION INFORMATION CELL

| LINK INFORMATION | | 8 BYTES |
|---|---|---|
| DATA | PARTITION MEMO | 8 BYTES |
| | PARTITION INFORMATION | 48 BYTES |

56 BYTES

FIG. 19

PARTITION INFORMATION

| | | | |
|---|---|---|---|
| PREVIOUS GROUPS WRITTEN | | | 4 BYTES |
| TOTAL GROUPS WRITTEN | | | 4 BYTES |
| RESERVED | | | 1 BYTE |
| PREVIOUS GROUPS READ | | | 3 BYTES |
| TOTAL GROUPS READ | | | 4 BYTES |
| RESERVED | | | 1 BYTE |
| TOTAL REWRITTEN FRAMES | | | 3 BYTES |
| RESERVED | | | 1 BYTE |
| TOTAL 3RD ECC COUNT | | | 3 BYTES |
| ACCESS COUNT | | | 4 BYTES |
| UPDATE REPLACE COUNT | | | 4 BYTES |
| PREVIOUS REWRITTEN FRAMES | | | 2 BYTES |
| PREVIOUS 3RD ECC COUNT | | | 2 BYTES |
| RESERVED | | | 1 BYTE |
| LOAD COUNT | | | 3 BYTES |
| RESERVED | | | 1 BYTE |
| VALID MAXIMUM ABSOLUTE FRAME COUNT | | | 3 BYTES |
| FLAG BYTE | BIT 1 | PREVENT WRITE | 1 BYTE |
| | BIT 2 | PREVENT READ | |
| | BIT 3 | PREVENT WRITE RETRY | |
| PARTITION ATTRIBUTE FLAGS | BIT 4 | PREVENT READ RETRY | |
| | BIT 5 | RESERVED | |
| | BIT 6 | RESERVED | |
| | BIT 7 | RESERVED | |
| | BIT 8 | PARTITION OPEN CLOSE FLAG | |
| MAXIMUM ABSOLUTE FRAME COUNT | | | 3 BYTES |

48 BYTES

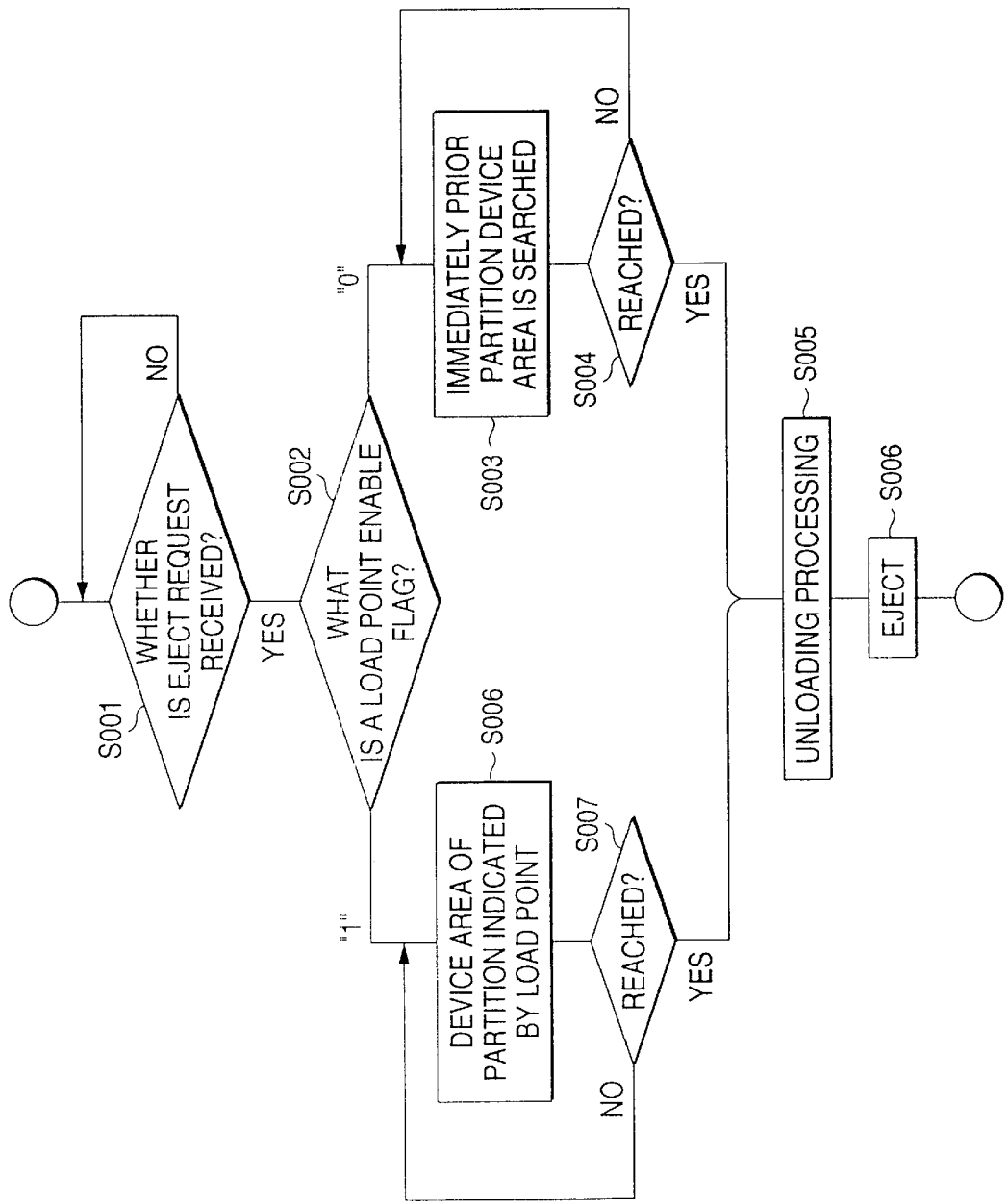

TAPE DRIVING APPARATUS AND RECORDING MEDIUM

BACKGROUND OF THE INVENTION

1. Field of the Invention

The present invention relates to a tape driving apparatus and a recording medium.

2. Description of the Related Art

As a driving apparatus capable of recording/reproducing digital data with respect to a magnetic tape, the so-called tape streaming drive is known. Such a tape streaming drive can have huge recording capacity of, for example, several tens to several hundreds gigabytes although depending upon the tape length of the tape cassette as a medium. Thus, the tape streaming drive is widely used for, for example, backing up data recorded on a medium such as a hard disk of a computer main body. Besides, the tape streaming drive is suitable also in the case where it is used for storing picture data, etc. of large data size.

As the foregoing tape streaming drive, there has been proposed such a tape streaming drive that a tape cassette of a 8 mm VTR is used as a recording medium, and recording/reproduction of data is carried out by employing a helical scan system with a recording head and a reproducing head provided at a required position of a rotary drum.

In the foregoing tape streaming drive using the tape cassette of the 8 mm VTR, for example, SCIS (Small Computer System Interface) is used as the input/output interface for recording/reproduction data.

At the time of recording, data supplied from, for example, a host computer are inputted through the SCSI interface, and the input data are subjected to predetermined compression processing and encoding processing and are recorded to the magnetic tape of the tape cassette.

At the time of reproduction, data of the magnetic tape are read out and are subjected to necessary decoding processing, and are transmitted to the host computer through the SCSI interface.

As the magnetic tape, one having a considerable length is required to obtain large capacity. Thus, recording/reproduction using such a long magnetic tape as a recording medium is carried out after movement to a desired position on the magnetic tape. Then, in the case where the tape cassette is ejected from the tape streaming drive, after movement is made toward an ejection management area formed in the vicinity of the position where the recording/reproduction has been carried out, the ejecting operation is carried out. Further, when the tape cassette is loaded into the tape streaming drive, movement is made from the ejection management area at the time of the ejection to a desired position where the recording/reproduction is carried out. That is, since the ejection position becomes coincident with the loading position, it becomes suitable for the case where the recording/reproduction is carried out by again using the previously used recording area.

However, in this case, in the tape cassette, the magnetic tape is kept, for example, for a long period in the state where the magnetic tape is led out from a reel hub, that is, the recording surface is exposed. Thus, there is a case where the recording surface is deteriorated by moisture or the like.

Besides, in the case where the magnetic tape is rewound to the vicinity of the head at the time of ejection of the tape cassette for the purpose of protecting the recording surface of the magnetic tape, in order to carry out the recording/reproduction at, for example, the physical center portion or end portion of the magnetic tape after the subsequent loading of the tape cassette, it is necessary to move the recording/reproduction position to a desired position by running the tape from the head. If the length of the tape is long, this requires large time.

Thus, such a tape driving apparatus has been required that it becomes possible to select the ejection position of the magnetic tape optimum for use in, for example, the tape cassette, so that the tape cassette becomes easy to handle and the storage property is improved.

SUMMARY OF THE INVENTION

The present invention has been made to solve the foregoing problem and provides a tape driving apparatus comprising tape drive means for running a magnetic tape when a tape cassette containing the magnetic tape is loaded and for carrying out recording or reproduction of information with respect to the magnetic tape; memory drive means for, in a case where a memory to record management information for managing recording or reproduction with respect to the magnetic tape of the loaded tape cassette is provided, reading or writing the management information by carrying out necessary communication processing to the memory; ejection information detecting means for detecting ejection position information specifying one of a plurality of ejection management areas formed on the magnetic tape from the memory; ejection management area search means for moving the magnetic tape to the specific ejection management area based on the ejection position information by running the magnetic tape in a case where the tape cassette is ejected; and ejection control means for ejecting the tape cassette in a case where the magnetic tape is moved to the specific ejection management area by the ejection management area search means.

Moreover, a recording medium comprises a tape cassette housing a magnetic tape, and a memory which is provided at the tape cassette and records management information for managing recording or reproduction with respect to the magnetic tape, in which a plurality of ejection management areas are formed on the magnetic tape, and the memory stores ejection position information to indicate a specific ejection management area among the plurality of ejection management areas.

According to the tape driving apparatus of the invention, since the position of the magnetic tape can be made the specific ejection management area in the case where the tape cassette is ejected, it becomes possible to select the ejection position of the magnetic tape.

Besides, in the recording medium of the invention, since the ejection position information is stored in the memory (MIC), it becomes possible to supply the ejection position information to the tape driving apparatus in which the recording medium is loaded.

BRIEF DESCRIPTION OF THE DRAWINGS

FIGS. 4A to 4D are explanatory views of the data structure on the magnetic tape of the tape cassette of the embodiment.

FIG. 9 is an explanatory view of ID area information of the tape cassette of the embodiment.

FIG. 10 is an explanatory view of the definition of the area ID of the tape cassette of the embodiment.

FIG. 12 is an explanatory view of manufacture information of the MIC of the embodiment.

FIG. 14 is an explanatory view of volume tag of the MIC of the embodiment.

FIGS. 15A and 15B are explanatory views of volume information of the MIC of the embodiment.

FIGS. 16A and 16B are explanatory views of eject status of the MIC of the embodiment.

FIGS. 17A and 17B are explanatory views of cell structure of the MIC of the embodiment.

FIG. 18 is an explanatory view of partition information cell of the MIC of the embodiment.

FIG. 19 is an explanatory view of partition information of the MIC of the embodiment.

FIG. 20 is a view for explaining an example of processing carried out by a system controller in the case where unload processing of a tape cassette and ejection are carried out.

DETAILED DESCRIPTION OF THE INVENTION

Hereinafter, embodiments of the present invention will be described.

Here, the present applicant has proposed various inventions as to a tape cassette provided with a nonvolatile memory, and a tape driving apparatus (tape streaming drive) capable of recording/reproducing digital data correspondingly to the tape cassette with the memory, and the present invention relates to a data storage system constituted by the tape cassette with the memory and the tape streaming drive. Incidentally, the nonvolatile memory provided in the tape cassette will be referred to as an MIC (Memory In Cassette).

The description will be made in the following order.
1. Structure of a tape cassette
2. Structure of a tape streaming drive
3. Structure of data on a magnetic tape
4. ID area
5. Data structure of an MIC
5. Unload 1. Structure of a Tape Cassette First, a tape cassette with an MIC corresponding to a tape streaming drive of an embodiment will be described with reference to FIG. 1 and FIG. 2.

Figure 1:
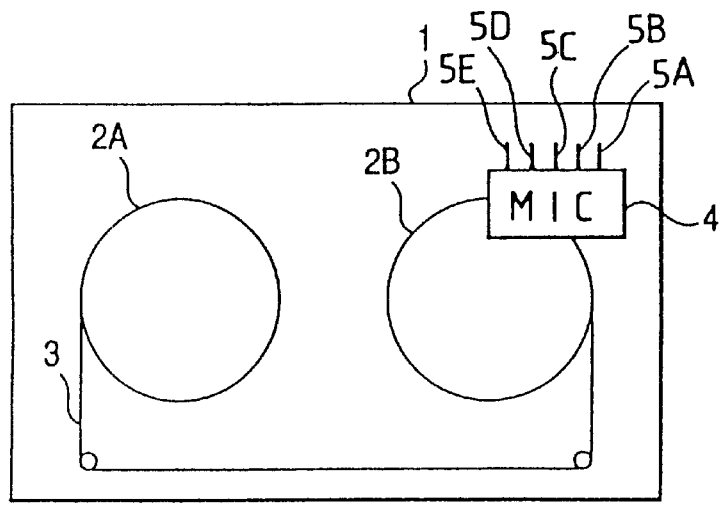
FIG. 1 is an explanatory view schematically showing an internal structure of a tape cassette of an embodiment.

FIG. 1 conceptually shows an inner structure of a tape cassette, and in the inside of the tape cassette 1 shown in this drawing, reel hubs 2A and 2B are provided and a magnetic tape 3 with a tape width of 8 mm is wound between the reel hubs 2A and 2B.

This tape cassette 1 is provided with an MIC 4 as a nonvolatile memory, and five terminals 5A, 5B, 5C, 5D and 5E are drawn out from a module of the MIC 4, which are respectively constructed as a power source terminal, a data input terminal, a clock input terminal, an earth terminal, and a preliminary terminal. As described later in detail, this MIC 4 stores information relating to the manufacturing date and manufacturing place of each tape cassette, the thickness and length of the tape, its material, a use history of recording data for each partition formed on the tape 3, etc., user information, and the like. Here, such various information stored in the MIC 4 is also referred to as "management information."

Figure 2:
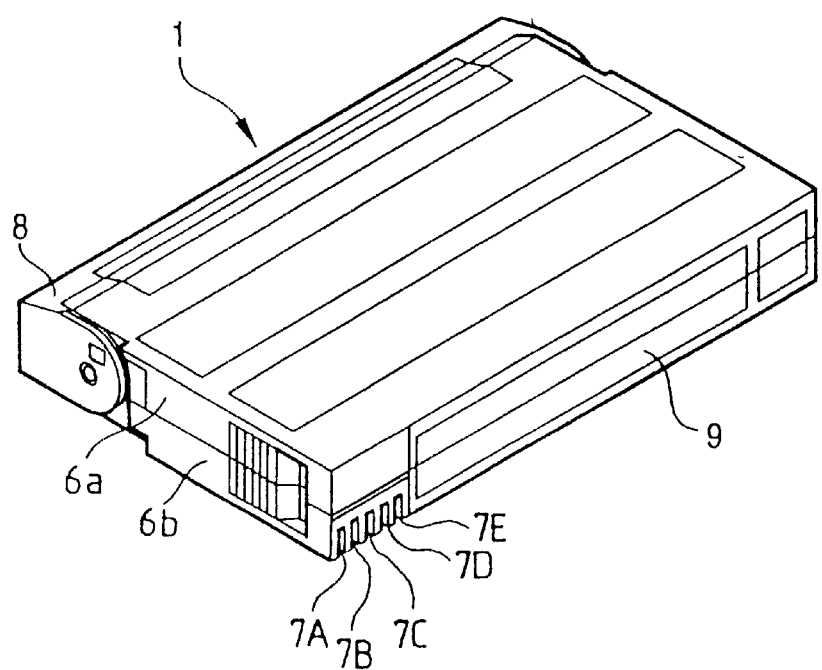
FIG. 2 is a perspective view showing the outer appearance of the tape cassette of the embodiment.

FIG. 2 shows an example of the outer appearance of the tape cassette 1, and the whole receptacle is constituted by an upper case 6a, a lower case 6b, and a guard panel 8, and is basically the same as a structure of a tape cassette used for a normal 8 mm VTR. Terminal pins 7A, 7B, 7C, 7D and 7E are provided on a label surface 9 of a side surface of the tape cassette 1, and are connected to the terminals 5A, 5B, 5C, 5D and 5E, respectively. That is, in this embodiment, the tape cassette 1 is physically brought into contact with a subsequently described tape streaming drive 10 through the terminal pins 7A, 7B, 7C, 7D and 7E, and mutual transmission of data signals and the like is carried out.

2. Structure of a Tape Streaming Drive

Next, a structure of the tape streaming drive 10 will be described with reference to FIG. 3. This tape streaming drive 10 carries out recording/reproduction by a helical scan system to the magnetic tape 3 of the loaded tape cassette 1.

On a rotary drum 11, two recording heads 12A and 12B each having different azimuth angle, and three reproducing heads 13A, 13B, and 13C each having a necessary azimuth angle are provided at predetermined angle intervals.

The rotary drum 11, around which the magnetic tape 3 drawn out from the tape cassette 1 is wound, is rotated by a drum motor 14A.

A capstan, not shown, for running the magnetic tape 3 at a constant speed is driven to be rotated by a capstan motor 14B.

The reel hubs 2A and 2B in the tape cassette 1 are respectively driven to be rotated by reel motors 14C and 14D separately in a forward direction and a reverse direction.

A loading motor 14E drives a not-shown loading mechanism and executes loading/unloading of the magnetic tape 3 to the rotary drum 11.

An eject motor 28 is a motor to drive a loading mechanism of the tape cassette 1, and causes seating of the inserted tape cassette 1 and ejecting operation of the tape cassette 1 to be executed.

The drum motor 14A, the capstan motor 14B, the reel motors 14C and 14D, and the loading motor 14E are respectively rotated by application of electric power from a mechanical driver 17.

The mechanical driver 17 drives the respective motors based on control from a servo controller 16. The servo controller 16 carries out rotation speed control of the respective motors so that running at normal recording/reproduction, tape running at high speed reproduction, tape running at fast-forwarding and rewinding, tape cassette loading operation, loading/unloading operation, tape tension control operation, etc. are executed.

Although not shown, in order for the servo controller 16 to execute servo control of the respective motors, a FG (frequency generator) is provided in each of the drum motor 14A, the capstan-motor 14B, and the reel motors 14C and 14D, so that rotation information of the respective motors can be detected.

The servo controller 16 judges the rotation speed of the respective motors on the basis of these FG pulses, detects an error from an objective rotation speed with respect to the rotation operation of the respective motors, and carries out applied power control corresponding to the amount of the error to the mechanical driver 17, so that rotation speed control by a closed loop can be realized. Thus, at the time of various operations, such as running at the time of normal recording/reproduction, high speed search, fast-forwarding, and rewinding, the servo controller 16 can carry out control so that the respective motors are rotated at the objective rotation speed corresponding to the respective operations.

An EEP-ROM 18 stores constants etc. used by the servo controller 16 for the servo control of the respective motors.

The servo controller 16 is bidirectionally connected through an interface controller/ECC formatter 22 (hereinafter referred to as "IF/ECC controller") to a system controller 15 executing control processing of the whole system.

In this tape streaming drive 10, a SCSI interface 20 is used for input/output of data. For example, at the time of data recording, data are sequentially inputted from a host computer 40 through the SCSI interface 20 in a transmission data unit of fixed length record and are supplied to a compression/expansion circuit 21. In such a tape streaming drive system, there is also a mode in which data are transferred from the host computer 40 in a collective unit of variable length data.

In the compression/expansion circuit 21, if necessary, inputted data are subjected to compression processing by means of a predetermined system. As an example of the compression system, if a compression system of LZ codes is employed, in this system, a specific code is assigned to a character string processed in the past and is stored in the form of a dictionary. A subsequently inputted character string is compared with the contents of the dictionary, and if the character string of the input data coincides with a code of the dictionary, this character string data is replaced with the code of the dictionary. Data of the input character string not coincident with the dictionary are sequentially given new codes and are registered in the dictionary. In this way, the data of the input character string are registered in the dictionary and the character string data are replaced with the codes of the dictionary, so that data compression is carried out.

The output of the compression/expansion circuit 21 is supplied to the IF/ECC controller 22, and the IF/ECC controller 22 temporarily stores the output of the compression/expansion circuit 21 in a buffer memory 23 through its control operation. The data stored in the buffer memory 23 finally comes to be handled in the fixed length unit corresponding to 40 tracks of the magnetic tape, called Group, by control of the IF/ECC controller 22, and ECC format processing is carried out to this data.

As the ECC format processing, an error collecting code is added to the recording data, and the data are subjected to modulation processing so that they become suitable to magnetic recording, and the data are supplied to an RF processing portion 19.

The RF processing portion 19 applies processing, such as amplification or record equalizing, to the supplied recording data to generate a recording signal, and supplies the signal to the recording heads 12A and 12B. By this, recording of data to the magnetic tape 3 from the recording heads 12A and 12B is carried out.

A data reproducing operation will be described in brief. The recording data of the magnetic tape 3 are read out as an RF reproducing signal by the reproducing heads 13A, 13B and 13C, and the reproducing output is subjected to reproduction equalizing, reproducing clock generation, binarization, decoding (for example, Viterbi decoding), and the like at the RF processing portion 19.

The thus read-out signal is supplied to the IF/ECC controller 22, and is first subjected to error correction processing and the like. Then, the signal is temporarily stored in the buffer memory 23, and is read out at a predetermined point of time and is supplied to the compression/expansion circuit 21.

In the compression/expansion circuit 21, on the basis of the judgement of the system controller 15, if the data have been compressed at the time of recording by the compression/expansion circuit 21, data expansion processing is carried out here, and if the data are uncompressed data, the data expansion processing is not carried out but the data are passed as they are and are outputted.

The output data of the compression/expansion circuit 21 are outputted as reproduction data to the host computer 40 through the SCSI interface 20.

This drawing shows the MIC 4 together with the magnetic tape 3 of the tape cassette 1. When the tape cassette main body is loaded into the tape streaming drive, this MIC 4 is connected so that input/output of data with respect to the system controller 15 becomes possible through a serial interface 30 with the terminal pins shown in FIG. 2 as the input/output stage. By this, the system controller 15 can read the management information recorded in the MIC 4 and update the management information.

Mutual transmission of information is carried out by using SCIC commands between the MIC 4 and the external host computer 40. Thus, it is not necessary to particularly provide a dedicated line between the MIC 4 and the host computer 40, and as a result, communication of data between the tape cassette and the host computer 40 can be realized through only the SCSI interface.

As described above, mutual transmission of information is carried out by using the SCSI interface 20 between the tape streaming drive 10 and the host computer 40, and the host computer 40 carries out various kinds of communication with the system controller 15 using the SCSI commands.

Thus, the host computer 40 can cause data writing/reading with respect to the MIC 4 to be executed by giving instructions to the system controller 15 through the SCSI commands.

An S-RAM 24 and a flash ROM 25 store data used by the system controller 15 for various processings.

For example, constants etc. used for control are stored in the flash ROM 25. The S-RAM 24 is used as a work memory or is made a memory used for storage or arithmetic processing of data read out from the MIC 4, data to be written into the MIC 4, mode data set in a unit of a tape cassette, various flag data, and the like.

The S-RAM 24 and the flash ROM 25 may be constructed as an internal memory of a microcomputer constituting the system controller 15, or such a structure may be adopted that a part of the area of the buffer memory 23 is used as the work memory.

Figure 3:
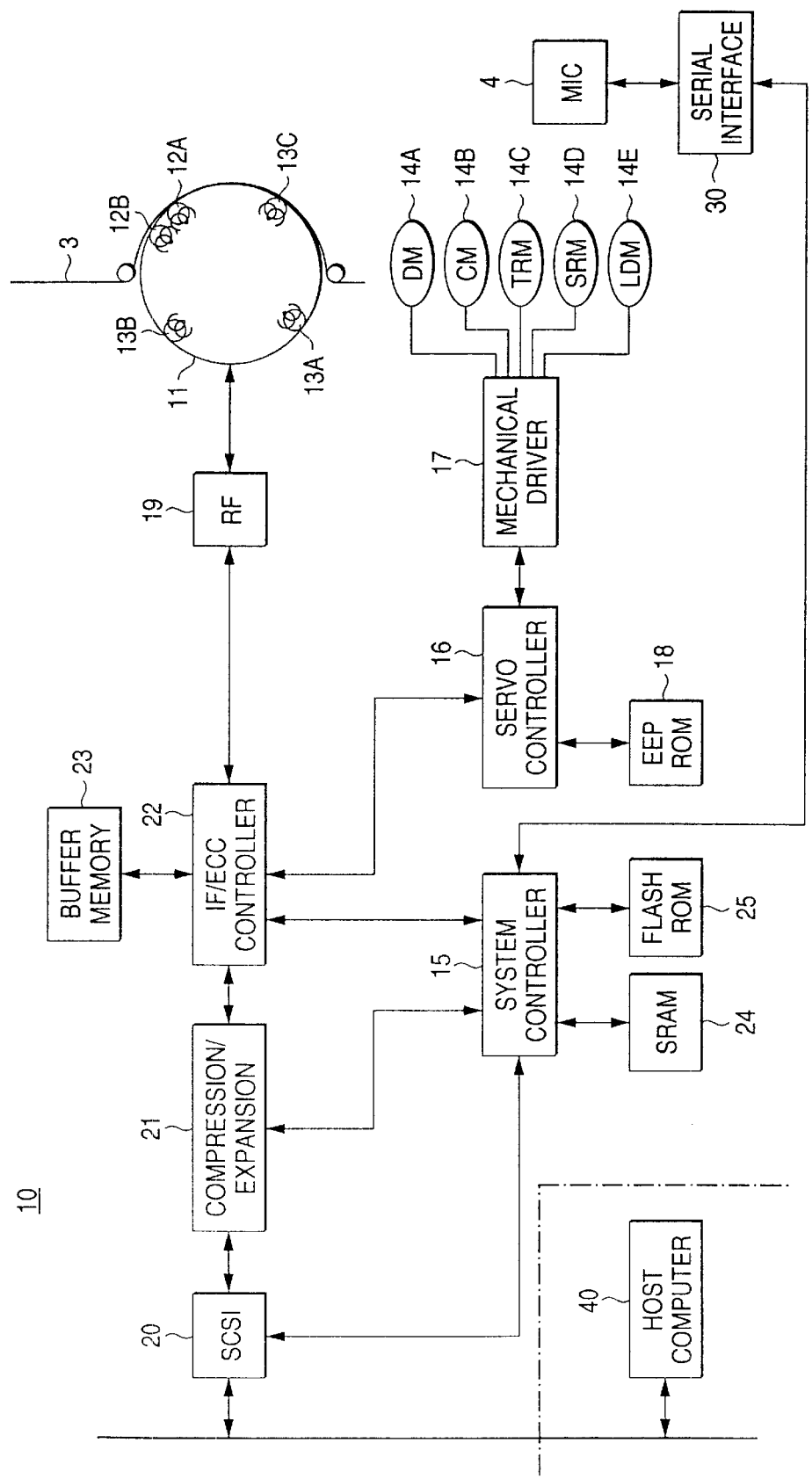
FIG. 3 is a block diagram of a tape streaming drive of an embodiment of the invention.

Although FIG. 3 shows, as an example, the state in which the tape cassette 1 provided with the MIC 4 is loaded, the tape streaming drive 10 is designed such that recording/ reproduction can be made even in the case where, for example, a tape cassette not provided with the MIC 4 is loaded. In this case, since the management information of the tape cassette is stored in the management area formed on the magnetic tape 3, the tape streaming drive 10 is made to read the management information recorded on the magnetic tape 3 or update the management information.

3. Structure of Data on a Magnetic Tape

Next, data format on the magnetic tape 3 of the tape cassette 1 in which recording/reproduction is carried out by the tape streaming drive 10 will be roughly described.

FIGS. 4A to 4D show the structure of data recorded on the magnetic tape 3. FIG. 4A schematically shows one magnetic tape 3. In this embodiment, as shown in FIG. 4A, one magnetic tape 3 can be divided in units of partitions and can be used. In the case of the system of this embodiment, it is possible to set 256 partitions at the maximum and to manage them. The respective partitions shown in this drawing are managed by being given a partition number, as indicated by partition #0, #1, #2, #3 . . . .

Thus, in this embodiment, although it is possible to carry out recording/reproduction of data independently for every partition, the recording unit of data in one partition shown, for example, in FIG. 4B can be made a fixed length unit called Group. Recording to the magnetic tape 3 is carried out in the unit of the group.

In this case, one group corresponds to the amount of data of 20 frames, and as shown in FIG. 4D, one frame is formed of two tracks. In this case, two tracks forming one frame are made tracks being adjacent to each other and having a plus azimuth and a minus azimuth. Thus, one group is formed of 40 tracks.

Figure 5A:
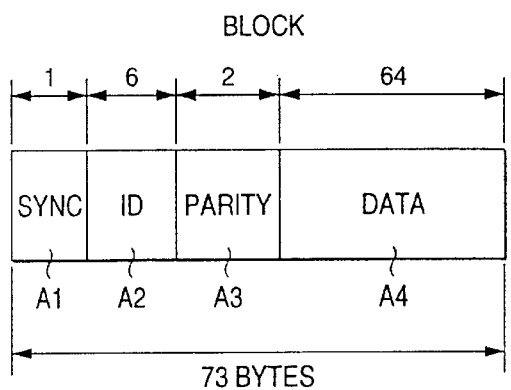
FIGS. 5A to 5C are explanatory views of the track structure on the magnetic tape of the tape cassette of the embodiment.
Figure 5B:
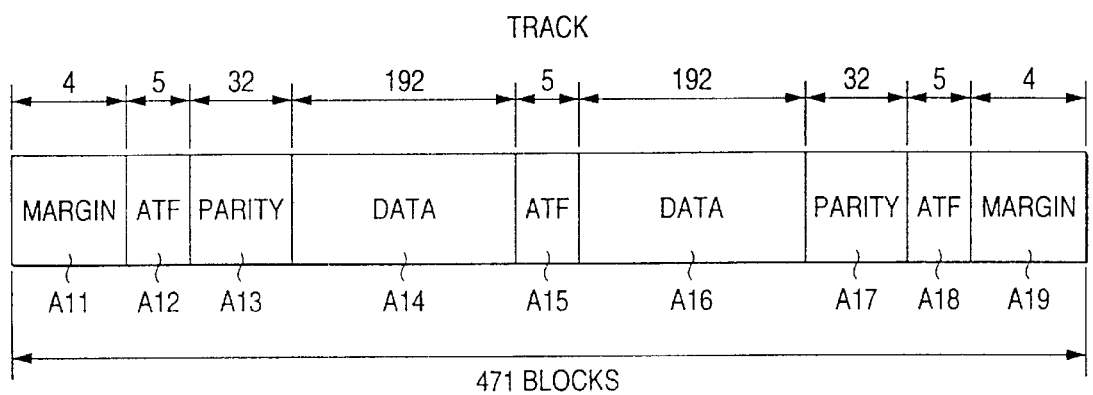

The structure of data of one track shown in FIG. 4D is shown in FIG. 5A and FIG. 5B. FIG. 5A shows the data structure in block units. One block is formed of ID area A2 of 6 bytes used for search or the like subsequent to SYNC data area A1 of 1 byte, parity area A3 for error correction made of 2 bytes for ID data, and data area A4 of 64 bytes.

The data for one track shown in FIG. 5B are formed of 471 blocks. In one track, as shown in the drawing, margin areas A11 and A19 of four blocks are provided at both ends, and ATF areas A12 and A18 for tracking control are provided behind the margin area A11 and before the margin area A19. Further, parity areas A13 and A17 are provided behind the ATF area A12 and before the ATF area A18. For these parity areas A13 and A17, an area of 32 blocks is provided.

ATF area A15 is provided to the middle of one track, and areas of 5 blocks are provided for these ATF areas A12, A15 and A18. Then, data areas A14 and A16 of 192 blocks are respectively provided between the parity area A13 and the ATF area A15, and between the ATF area A15 and the parity area A17. Thus, all the data areas (A14 and A16) in one track occupy 192×2=384 blocks among all 471 blocks.

Figure 5C:
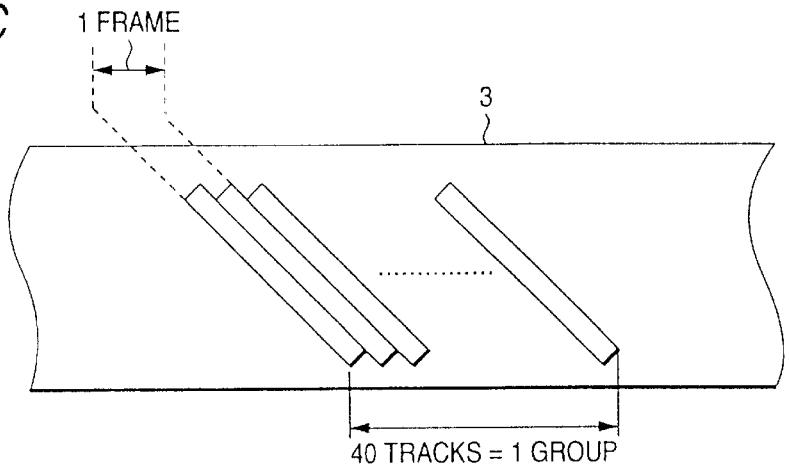

The above tracks are physically recorded onto the magnetic tape 3 as shown in FIG. 5C, and as described above, 40 tracks (=20 frames) constitute one group.

Figure 6A:
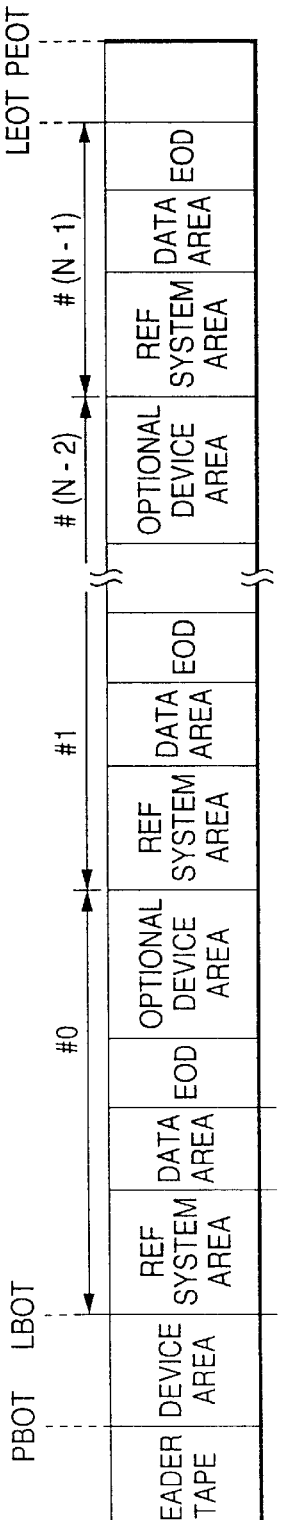
FIGS. 6A to 6C are explanatory views of the area structure of the magnetic tape of the tape cassette of the embodiment.
Figure 6B:
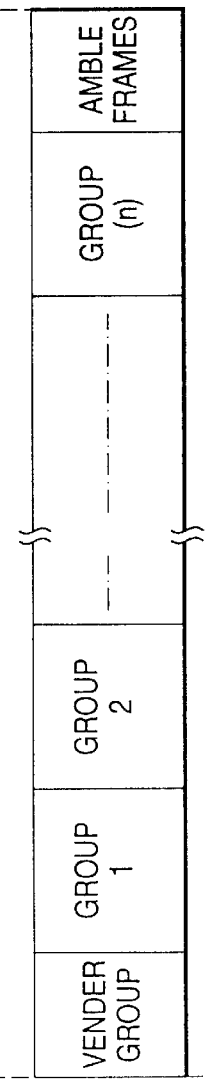
Figure 6C:
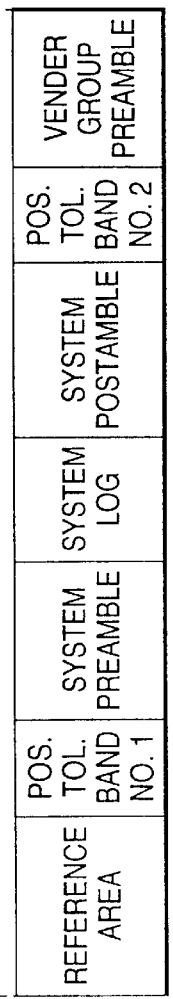

Data recording is carried out with the area structure shown in FIGS. 6A to 6C to the magnetic tape 3 explained in FIGS. 4A to 4D and 5A to 5C.

Here, an example in which N partitions of partitions #0 to #N−1, are formed is shown.

As shown in FIG. 6A, leader tape is physically positioned at the leading position with respect to the initial portion of the magnetic tape. Next, device area serving as the area where loading/unloading of the tape cassette is carried out is provided. The leading portion of this device area is made beginning position PBOT (Physical Beginning of Tape).

Subsequent to the device area, reference area concerning the partition #0 and system area in which use history information etc. of the tape is stored (hereinafter, the areas including the reference area will be referred to as "system area") are provided, and data area is provided subsequently thereto. The leading portion of the system area is made LBOT (Logical Beginning of Tape).

In this system area, as shown in an enlarged view of FIG. 6C, reference area, position tolerance band No. 1, system preamble, system log, system postamble, position tolerance band No. 2, and vender group preamble are formed.

In the data area subsequent to such system area, as shown in an enlarged view of FIG. 6B, vendor group indicating information as to a vendor who prepares and supplies data is first provided, and next, plural groups shown in FIG. 4C are continuously formed as designated by group 1 to group (n). Subsequently to the final group (n), the amble frame is provided.

Subsequent to such data area, as shown in FIG. 6A, the area of EOD (End of Data) indicating the end of the data area of the partition is provided.

In the case where only one partition is formed, the end of the EOD of the partition #0 is made end position LEOT (Logical End of Tape) of the logical tape. However, this case is an example in which N partitions are formed, optional device area is formed subsequent to the EOD of the partition #0.

Although the device area subsequent to the foregoing beginning position PBOT becomes an area where loading/ unloading to the partition #0 is carried out, the last optional device area of the partition #0 becomes an area where loading/unloading to the partition #1 is carried out. In this example, as described later, it is designed such that on the basis of ejection position information, the device area or optional device area as an ejection management area can be arbitrarily selected. That is, unloading at a desired position is made possible.

In the partition #1, areas are constructed similarly to the partition #0, and at the last, optional device area serving as the area where loading/unloading corresponding to the next partition #2 is carried out is formed.

Subsequently, partitions up to the partition #(N−1) are similarly formed.

In the last partition #(N−1), the optional device area is not formed since it is unnecessary, and the end of EOD of the partition #(N−1) is made end position LEOT (Logical End of Tape) of the logical tape.

PEOT (Physical End of Tape) indicates the end position of the physical tape or the physical end position of the partition.

4. ID area

Next, the ID area A2 shown in FIG. 5A will be described with reference to FIGS. 7 to 10.

Figures 7, 8:
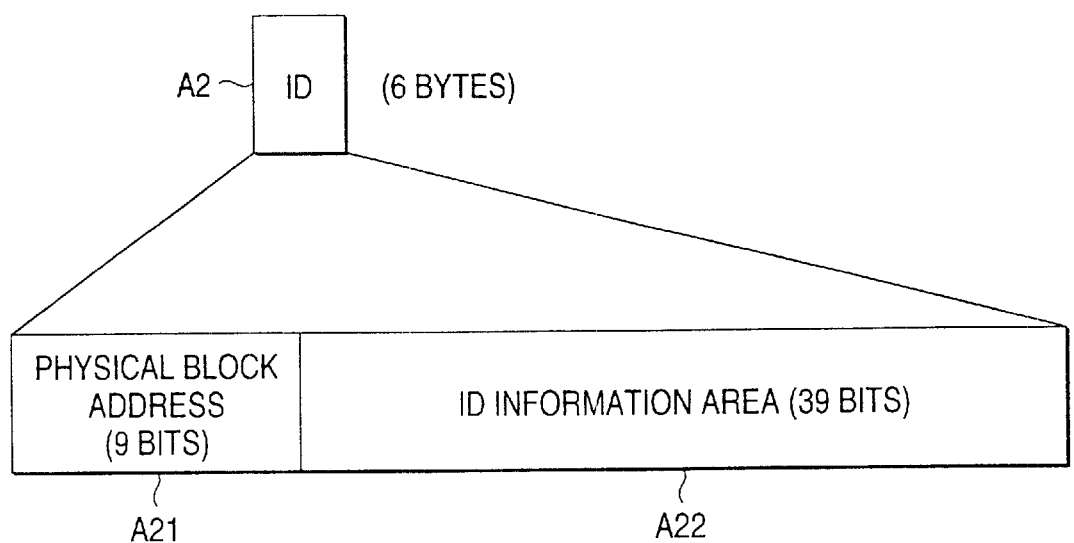
FIG. 7 is an explanatory view of an ID area on the magnetic tape of the tape cassette of the embodiment.
FIG. 8 is an explanatory view of a physical block address of the ID area of the tape cassette of the embodiment.

FIG. 7 shows data structure of the ID area A2, and this ID area A2 is formed of Physical Block Address A21 of 9 bits, and ID Information Area A22 of 39 bits subsequent thereto.

As described above, since all data areas (A14 and A16) in one track is made of 384 blocks, the number of the physical block addresses A21 contained in all the data areas is also made 384.

These 384 physical block addresses A21 are given address values in such a manner that the address values are increased from 0 to 383 in decimal notation in sequence from the physical block address A21 positioned at the leading portion of one track as shown schematically, for example, in FIG. 8.

By this, for example, through the side of the recording and reproducing apparatus, it is made possible that information of the ID information area A22 contained in the data area of one track can be properly handled. Here, the data size of the ID information area A22 contained in the data area of one track becomes 1872 bytes as is obtained from 39 (Bit)×384 (Block)=14796 (Bit)=1872 (Byte).

FIG. 9 shows the kind of the ID area information stored in the ID information area A22, and the respective ID information shown in this drawing are stored in the areas of the ID Information Areas A22, A22 . . . of 1872 bytes in total contained in the data area on one track in such a manner that they are allocated in accordance with a predetermined rule. Besides, in view of enabling reliable reading of the ID area information by the tape streaming drive 10, the ID area information of the same kind is recorded for every track plural times in accordance with a predetermined rule.

In FIG. 9, the Raw Format ID (16 bits) indicates the type of the basic format with respect to the magnetic tape. In the case of this embodiment, for example, track pitch, data size of one frame, the number of blocks contained in one track, data size of one block, tape length, tape thickness, tape material, etc. are indicated. Logical Format ID (8 bits) indicates type of recording format actually used.

Logical frame ID (8 bits) consists of Last Frame ID (1 bit), ECC Frame ID (1 bit), and Logical Frame Number (6 bits) as shown in the drawing. The last frame ID indicates whether the current frame including the ID area is the last frame in the group, and the ECC frame ID indicates whether recording data of the data area of the current frame is made ECC (error correction code).

As described above, one group consists of 20 frames, and the logical frame number indicates what number frame the current frame is within the current group.

Partition ID (16 bits) indicates the partition number of partition including the current frame.

Area ID (4 bit) indicates which area the frame belongs to. Data ID (4 bits) indicates type of the processing form of data based on the recording format, and N-Position (4 bits) and N-Repeats (4 bits) are areas where information relating to data corresponding to the multiplexing recording mode are defined.

Group Count (24 bits) indicates the total number of groups up to the group where the frame is included in the current partition. File-Mark Count (32 bits) indicates, in the current partition, the total number of file marks included from the start position thereof up to the current group. File-Mark is information indicating delimitation of data file in one partition.

Save-Set Mark Count (32 bits) indicates, in the current partition, the total number of file marks included from the start position to the current group. Save-set mark is information indicating delimitation of the data save position in one partition.

Record Count (32 bits) indicates, in the current partition, the total number of records included from the start position to the current group. Absolute Frame Count (24 bits) indicates, in the current partition, the total number of frames included from the start position to the current group. Besides, Reserved area is provided in preparation for future addition of ID area information, etc.

Incidentally, the definition of the ID area information and the number of bits given to respective ID area information shown in this drawing are only one example, and they may be changed in accordance with actual use condition.

Here, among various ID area information shown in FIG. 9, the Area ID will be described.

FIG. 10 shows the content of definition of the area ID, and in this case, bit numbers (3-2-1-9) are respectively given to 4 bits constituting the area ID. In the case where respective values of the bit numbers (3-2-1-0) are expressed as [0000] as shown in the drawing, it is defined that the area is Device Area.

In the case where they are expressed as [0001], the area is made Reference Area, and in the case where they are expressed as [0010], the area is made System Area. In the case where they are expressed as [0011], the area is made Reserved.

Besides, when expressed as [0100], the area is made to be Data Area; when expressed as [0101], the area is made to be EOD area; when expressed as [0110], the area is made to be Reserved; and when expressed as [0111], it is defined that the area is Option Device Area except for the essential device area shown in FIG. 6 and for carrying out loading/unloading of the magnetic tape 3.

In this drawing, the number shown within parentheses ( ) in the respective rows where values of bits of the bit numbers (3-2-1-0) are indicated are indicated are assumed to indicate the respective bit values by the decimal notation.

The ID information as in FIGS. 9 and 10 are recorded in the respective blocks on the magnetic tape, so that the tape streaming drive 10 can judge, at the time of reproduction or search of the magnetic tape 3, the area under running, particular position in the area, and further, partition number, etc.

5. Data Structure of MIC

Next, the data structure of the MIC 4 provided at the tape cassette 1 will be described.

Figure 11:
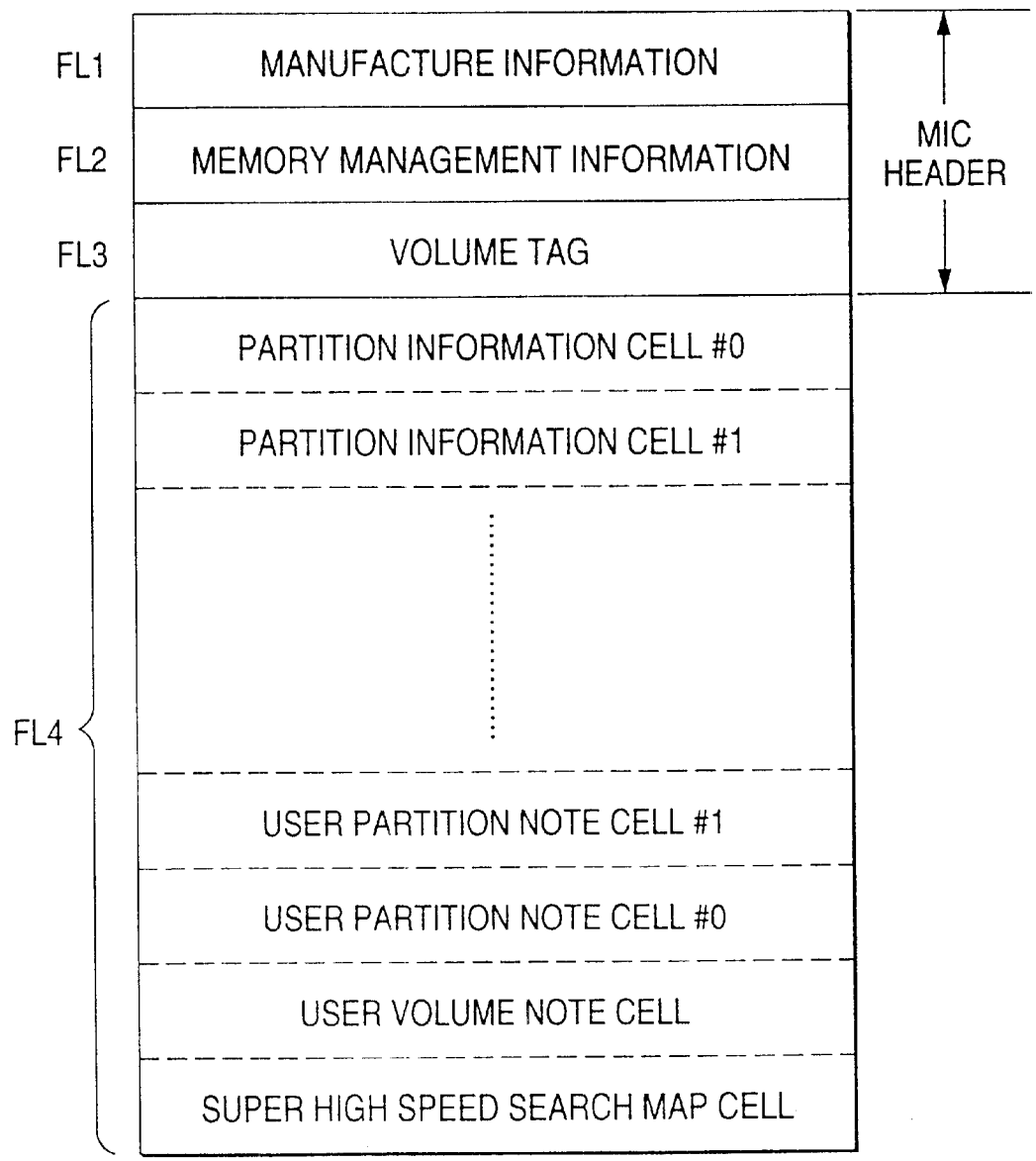
FIG. 11 is an explanatory view of data structure of an MIC of an embodiment.

FIG. 11 is a view schematically showing an example of the structure of data stored in the MIC 4. As memory areas of the MIC 4, fields FL1 to FL4 are set as shown in the drawing.

In these fields FL1 to FL4, various information at the time of manufacture of the tape cassette, tape information at the time of initialization, information for every partition, etc. are written.

The field FL1 is made to be Manufacture Information, and is made to be manufacture part in which various information at the time of manufacture of the tape cassette are stored.

The field FL2 is made to be Memory Management Information, and is made to be drive initialize part in which information at the time of initialization and the like are mainly stored.

The Field FL3 is made to be Volume Tag, and basic management information of the whole tape cassette is stored.

The field FL4 is made to be an area of memory free pool, and is made to be an area where additional storage of management information is made possible. In this memory pool, the process of recording/reproducing operation and various information according to necessity are stored. Incidentally, data group of one unit stored in the memory free pool will be referred to as "cell".

First, in accordance with the partitions formed on the magnetic tape 3, partition information cells #0, #1 . . . are sequentially written from the leading portion side of the memory free pool. That is, the partition information cells are formed as cells the number of which is the same as the partitions formed on the magnetic tape 3.

From the rear end side of the memory free pool, Super High Speed Map Cell is written as map information for high speed search.

Subsequently, from the rear end side, User Volume Note Cell and User Partition Note Cell are written. The User Volume Note Cell is information such as comments inputted by the user with respect to the whole tape cassette, and the user partition note cell is information such as comments inputted by the user with respect to each partition. Thus, these are stored when the user indicates writing, and all of these information are not necessarily stored.

An intermediate area where these information are not stored is left as a memory free pool for later writing.

The manufacture information of the field FL1 is made, for example, a structure as shown in FIG. 12. The size (number of bytes) of respective data is shown at the right side.

In the manufacture information, first, information of checksum to data of the Manufacture Information is stored as manufacture part checksum in the first one byte. The information of the manufacture part checksum is given at the time of manufacture of the cassette.

As real data constituting the manufacture part, data from MIC type to Write Protect byte count are written. The character "reserved" indicates reserved areas for future data storage. The same applies to the subsequent explanation.

MIC type is data indicating the type of the MIC actually provided at the tape cassette.

MIC manufacture date indicates manufacture year, month, day (and time) of the MIC.

MIC manufacture line name indicates information of line name where the MIC was manufactured.

MIC manufacture plant name indicates information of factory name where the MIC was manufactured.

MIC manufacturer name indicates information of manufacture company of the MIC.

MIC name indicates information of vendor name of the MIC.

In cassette manufacture data, cassette manufacture line name, cassette manufacture plant name, cassette manufacturer name, and cassette name, information of the cassette itself similar to the foregoing information relating to the MIC, are respectively written.

As OEM customer name, information of the opposite company name of OEM (Original Equipment manufacture) is stored.

As physical tape characteristic ID, for example, information of physical characteristics of the magnetic tape 3, such as tape material, tape thickness, and tape length, is indicated.

As maximum clock frequency, information indicating the maximum clock frequency to which the MIC corresponds is stored.

Maximum write cycle indicates, for example, as characteristic of the MIC, information indicating data of how many bytes can be transmitted in one communication with the tape streaming drive 10. This information depends on physical characteristics of nonvolatile memory used as the MIC.

As MIC capacity, memory capacity information of the MIC is indicated.

Write protect start address is used to make a necessary area of part of the MIC write inhibit, and indicates a start address of write inhibit area.

Write protect byte count indicates the number of bytes of the write inhibit area. That is, the area from the address specified by the write protect start address, which is occupied by the bytes the number of which is indicated by the write protect byte count, is set as the write inhibit area.

Figure 13:
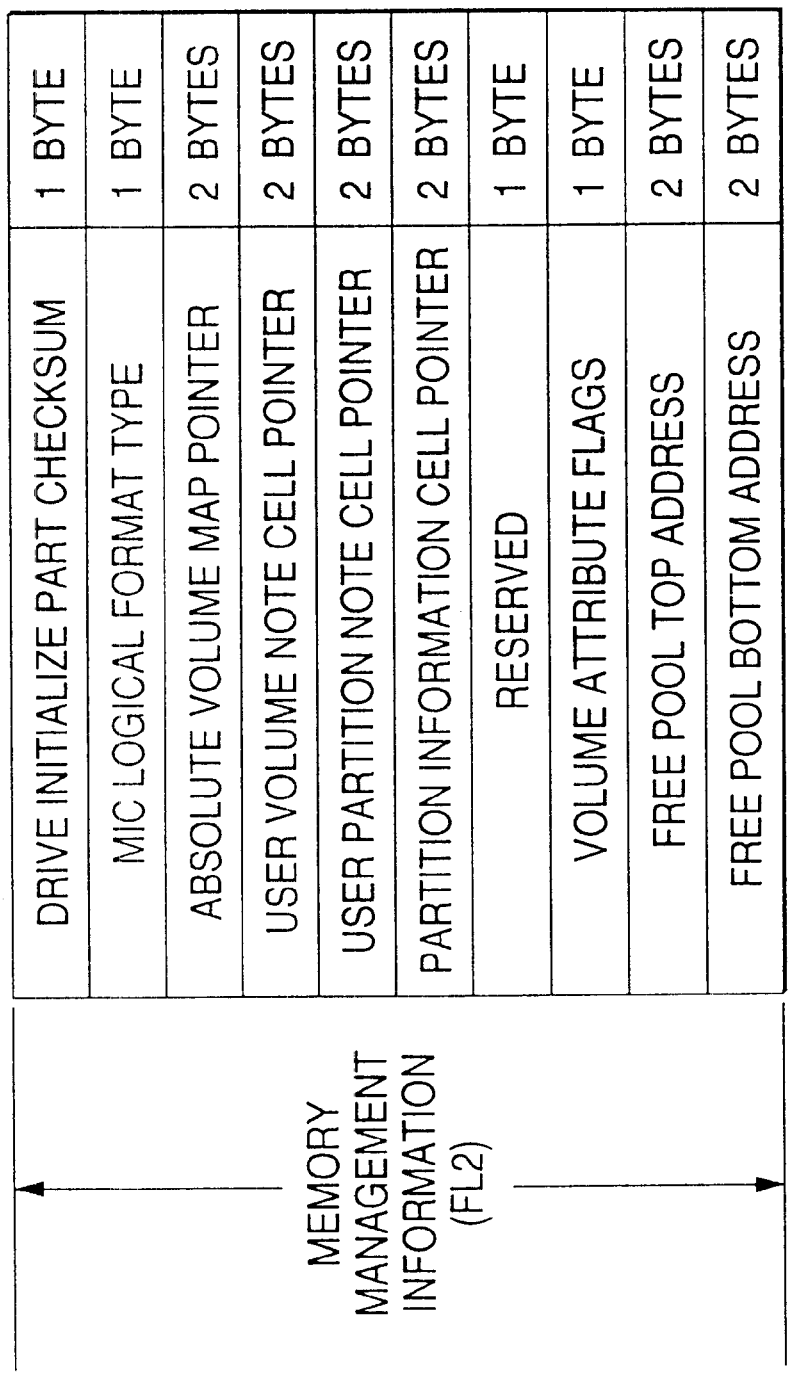
FIG. 13 is an explanatory view of memory management information of the MIC of the embodiment.

Subsequently, the structure of the Memory Management Information of the field FL2 of FIG. 11 will be described with reference to FIG. 13. The size (number of bytes) of respective data is shown at the right side.

In the memory management information, first, as Drive Initialize Part Checksum, information of checksum to data of memory management information as this drive initialize part is stored.

As real data constituting the memory management information, information from MIC Logical Format Type to Free Pool Bottom Address are written.

First, as the MIC Logical Format Type, ID number of logical format of the MIC is stored. As the MIC format, for example, other than the basic MIC format, there are various formats relating to firmware update tape MIC format, reference tape MIC format, cleaning cassette MIC format, and the like, and the ID number corresponding to the MIC format of the tape cassette is indicated.

In Absolute Volume Map Pointer, a pointer indicating the leading address of the area of the super high speed search map cell of FIG. 11 is disposed.

User Volume Note Cell Pointer indicates a memory area where the user can freely write and read data with respect to the tape cassette through the SCSI, that is, the start address of the user volume note cell shown in FIG. 11.

User Partition Note Cell pointer indicates a memory area where the user can freely write and read data with respect to the respective partitions through the SCSI, that is, the start address of the user partition note cell shown in FIG. 11. Although there is a case where a plurality of user partition note cells are stored, this user partition note cell pointer indicates the start address of the leading cell among the plurality of user partition note cells.

Partition Information Cell Pointer indicates the start address of the partition information cell #0 of FIG. 11.

The number of partition information to be written in the memory free pool becomes equal to the number of partitions formed on the magnetic tape 3, and all the partition information cells #0 to #N are linked through a link structure by a pointer. That is, the partition information cell pointer is made the root indicating the address of the partition #0, and a pointer of the subsequent partition information cell is disposed in the just prior partition information cell.

As described above, by the respective pointers (absolute volume map pointer, user volume note cell pointer, user partition note cell pointer, partition information cell pointer), the position of respective data in the field FL4 is managed.

Volume Attribute Flag is made a flag of one byte for providing logical write inhibit tab to the MIC 4. That is, the content indicated by the MIC header flag is write enable/inhibit of manufacture part portion, or write enable/inhibit of portion other than the manufacture part.

Free Pool Top Address and Free Pool Bottom Address respectively indicate a start address and an end address of memory free pool in the field FL2 at that point of time. Since the area as the memory free pool is changed according to writing or erasing of the partition information, user partition note, and the like, the free pool top address and the free pool bottom address are updated accordingly.

Subsequently, the structure of the volume tag of the field FL3 of FIG. 11 will be described with reference to FIG. 14. The size (number of bytes) of respective data is indicated at the right side.

At the leading portion of the volume tag, Volume Information Checksum stores information of checksum to data of Volume Information where basic management information of the whole tape cassette is stored.

Further, Accumulative Partition Information Checksum stores information of checksum to data of Accumulative Partition Information where history information from the time of manufacture of the tape cassette is stored.

Subsequent to Volume Note Checksum and Volume Note, Cartridge Serial Number stores serial number of character information of 32 characters based on, for example, ASCII code.

In Manufacture ID, code number of a manufacturer of the tape cassette 1 is stored as a manufacturer identifier.

Secondary ID is a secondary identifier corresponding to the type of the tape cassette 1, and for example, attribute information of the tape is stored as a code value of one byte.

Cartridge Serial Number Part Checksum is made checksum information of the cartridge serial number, the manufacture ID, and the secondary ID.

Specific Volume Tags 1 to 13 are formed, for example, as reserved, and the respective areas are constituted by, for example, 36 bytes.

FIGS. 15A and 15B are views for explaining the structure of the volume information FL31 of the volume tag FL3.

As shown in FIG. 15A, in the volume information, as Volume Information Checksum, information of checksum to the data of the volume information is stored in the leading portion of one byte.

As real data constituting the volume information, Eject Status of 20 bytes, Reel Diameter of 4 bytes, Initialize Counter of 3 bytes, and Volume Information On Tape of 72 bytes are written.

As the Eject Status of 20 bytes and the Reel Diameter of 4 bytes, data shown in FIGS. 16A and 16B are written.

These are made to write position and state of the magnetic tape 3 when the tape cassette is ejected. First, as the eject status, Absolute Frame Count, Partition ID, Group Count, Record Count, Save Set Mark Count, and File Mark Count are written. That is, identification information (partition ID) of partition on the magnetic tape 3 at the time of ejection, and various count values are stored.

As the Reel Diameter, the numerical value of S reel diameter (diameter including the magnetic tape wound on a reel hub) as the position of the magnetic tape at the time of ejection is divided into an integer part and a fraction part, which are respectively written as Supply Reel Integer Part and Supply Reel Fraction Part by one byte.

Similarly, the numerical value of T reel diameter as the position of the magnetic tape at the time of ejection is divided into an integer part and a fraction part, which are written as Take Up Reel Integer Part and Take Up Reel Fraction Part by one byte, respectively.

Next, Initialize Count indicated in FIG. 15A is made information of the number of times the magnetic tape 3 has been initialized.

The content of the Volume Information On Tape FL311 becomes as shown in FIG. 15B.

As shown in the drawing, except for areas as reserved, in the Volume Information On Tape FL311, Load Point FL311*a* of 1 byte, Super High Speed Search Enable Flag of 1 bit, System Log Allocation Flag of 2 bits, Load Point Enable Flag FL311*b* of 1 bit, AIT Native Flag of 1 bit, Last Valid Partition Number of 1 byte, and Optional Device Area Allocation Map of 32 bytes are written.

In the case where a plurality of partitions (multiple partitions) are formed, as ejection position information of the magnetic tape 3 when the tape cassette 1 is ejected from the tape streaming drive 10, for example, information for specifying the device area or optional device area of the specific partition is stored in the Load Point FL311*a*. As the Load Point FL311*a*, for example, partition number is specified, and unload processing is carried out in the device area or optional device area just before the partition specified by this, and ejection is carried out.

The Super High Speed Search Enable Flag is made a flag to indicate whether or not a function to further speed up high speed search is made effective by using the tape position information stored as the absolute volume map of the MIC 4.

The System Log Allocation Flag is made such a flag as to indicate where use history (system log) of the tape cassette is stored, and is made to be able to distinguish such states that, for example, information is recorded on only the magnetic tape 3, is recorded on neither the magnetic tape 3 nor the MIC 4, is recorded on both the magnetic tape 3 and the MIC 4, and is recorded on only the MIC 4.

In the case where multiple partitions are formed on the magnetic tape 3, the Load Point Enable Flag FL311*b* is made such a flag as to indicate whether or not the Load Point FL311*a* is regarded as effective. That is, for example, in the case where "1" is set, assuming that it is in the partition specified by the Load Point FL311*a*, the tape streaming drive 10 carries out unload processing and ejection at the ejection position of the just prior device area or optional device area, and for example, in the case where "0" is set, unload processing and ejection are carried out in the optional device area just before the current partition.

The AIT Native Flag is made such a flag as to indicate the mode of the tape cassette 1.

The Last Valid Partition Number indicates the number of the last partition formed.

The Optional Device Area Map is made of 256 bits, and each bit corresponds to each partition formed on the magnetic tape 3. In the case where the value of a bit is "1", it is indicated that an optional device area is formed in the partition corresponding to the bit.

Subsequently, cells stored in the field FL4 shown in FIG. 11 will be described.

As described above, the partition information cell, the user partition note cell, and the like are stored in the field FL4.

The structure of the respective cells will be described with reference to FIGS. 17A and 17B.

As shown in FIG. 17A, one cell is formed of Link Information of 8 bytes and Data of n bytes (different by the kind of the cell).

The Link Information of 8 bytes is provided for each cell, and its structure becomes as shown in FIG. 17B.

First, as checksum relating to data in the cell, Cell Checksum of 1 byte is provided.

As Cell Size of 2 bytes, the size of the cell is indicated.

Previous Cell Pointer and Next Cell Pointer are actual linkage data (data constructing link structure), and when a plurality of cells of the same kind are linked, previous and next cells are specified by the Previous Cell Pointer and the Next Cell Pointer.

As cells of such structure, partition information cell, super high speed search map cell, user volume note cell, and user partition note cell exist. In the partition information cell, the cell size becomes a fixed value. In the other cells, the cell size becomes a variable value.

The partition information cell in which the cell size becomes a fixed value will be described with reference to FIG. 18 and FIG. 19.

The partition information cell is formed of Link Information of 8 bytes and Data of 56 bytes as shown in FIG. 18. In the Data of 56 bytes, 8 bytes thereof are made to be Partition Memo, and 48 bytes are made to be Partition Information.

In the partition information (system log), various information relating to use history with respect to the partition on the magnetic tape 3 to which the cell corresponds are stored, and come to be used as information for management of recording/reproducing operation of the tape streaming drive itself.

The data structure of the partition information in one partition information cell corresponding to a certain partition is defined, for example, as shown in FIG. 19.

In Previous Groups Written of 4 bytes, counting from the time of final update of the partition information, information of the number of groups in the partition physically recorded to the magnetic tape 3 is indicated.

In Total Groups Written of 4 bytes, the total number of groups recorded to the partition until now is indicated. This value is added up until, for example, the tape cassette becomes almost dead and becomes unusable or discarded.

In these Previous Groups Written and Total Groups Written, for example, in case data are recording to the magnetic tape 3 with the tape streaming drive, in accordance with the number of groups newly recorded through the current recording operation, the value of the area is incremented by processing of the system controller 15 of the tape streaming drive.

In Previous Groups Read of 3 bytes, counting from the time of final update of the partition information, the number of groups physically read out is indicated.

Total Groups Read of 4 bytes indicates a value of accumulated number of groups read out from the partition until now.

Total Rewritten Frames of 3 bytes indicates a value of accumulated number of frames in which a request for data rewriting was made in the partition based on RAW.

Total 3rd ECC Count of 3 bytes indicates a value of accumulated number of groups in which error correction using C3 parity is carried out in the partition.

In the tape streaming drive of this embodiment, with respect to data read out from the magnetic tape 3, error correction is carried out by C1, C2, and C3 parity, and the C3 parity is used in the case where recovery of data was not be made by only C1 or C2 parity.

Access Count of 4 bytes indicates the number of times the tape streaming drive accesses the partition on the magnetic tape 3. The access here means the number of times of physical passing through the partition, that is, the number of times recording or reproduction was carried out to the partition, also including the number of times of passing.

Update Replace Count of 4 bytes indicates information of accumulated number of times data are rewritten to the magnetic tape 3 in the partition through update. That is, the number of times of update to the partition is indicated.

Previous Written Frames of 2 bytes indicates information of the number of frames in the partition where a request for data rewriting was made through the RAW previously explained, counting from final update of the partition information.

Previous 3rd ECC Count of 2 bytes indicates the number of groups where error correction was carried out using C3 parity, counting from the last update of the partition information.

Load Count of 3 bytes indicates a value of accumulated number of times the tape was loaded.

Valid Maximum Absolute Frame Number of 3 bytes indicates information of frame count to the last frame made effective in the partition.

On the other hand, Maximum Absolute Frame Count of the last 3 bytes of the partition information indicates information of the last frame count of the partition.

In Partition Attribute Flag of 1 byte, the content of flag for each bit is defined as follows.

That is, as Prevent Write Flag, Prevent Read Flag, Prevent Write Retry Flag, and Prevent Read Retry Flag, there are provided flags indicating write enable/inhibit to the partition, read enable/inhibit, rewrite enable/inhibit of data on the basis of RAW at the time of recording, and data read-out retry enable/inhibit at the time of reproduction, respectively.

As Partition Open Close Flag, a flag is prepared which is set during recording to the partition and is reset in response to the end of recording.

The super high speed search map cell formed at the rear end of the field FL4 is made to have a cell structure with link information like the partition information, and is made data map information necessary for realization of high speed search function using the performance of the reel motor to the utmost without obtaining ID information from the magnetic tape 3 in real time.

As described above, although the data structure in the MIC 4 becomes as described with reference to FIGS. 11 to 19, the data structure of the MIC 4 is merely an example, and arrangement of data and setting of areas, contents of data, size of data, and the like are not limited to these.

6. Unload

FIG. 20 is a flowchart for explaining an example of process transition of the system controller 15 in the case where an unload command of the tape cassette 1 is received from the host computer 40 in the state where the tape cassette 1 is loaded in the tape streaming drive 10.

When receiving the eject command from the host computer 40 (S001), the tape streaming drive 10 judges the content of the load point enable flag FL311$b$ (S002).

In the case where it is judged that the load point enable flag FL311$b$ is, for example, "0", that is, the load point FL311$a$ is not effective, search of the device area (or optional device area) just before the current partition is started (S003). In this case, for example, the search is carried out while detecting the partition ID written in the ID area (FIG. 9) on the magnetic tape 3, or high speed search with motor rotation information based on the FG pulse is carried out.

When reaching a desired device area (device area of the just prior partition) (S004), as unloading processing, for example, update of various information such as eject status as unloading position (FIG. 16A) and reel diameter information (FIG. 16B) is carried out and the information is written in the MIC 4 (S005), and ejection of the tape cassette 1 is carried out (S0006).

In the case where it is judged that the load point enable flag FL311$a$ is, for example, "1", that is, the load point FL311$a$ is effective, search of the device area or optional device area just before the partition specified by the load point FL311$a$ is started (S006). The search operation is the same as the example explained in step S003.

When reaching a desired device area (S007), necessary unloading processing is carried out (S005), and ejection of the tape cassette 1 is carried out (S006).

Figure 21:
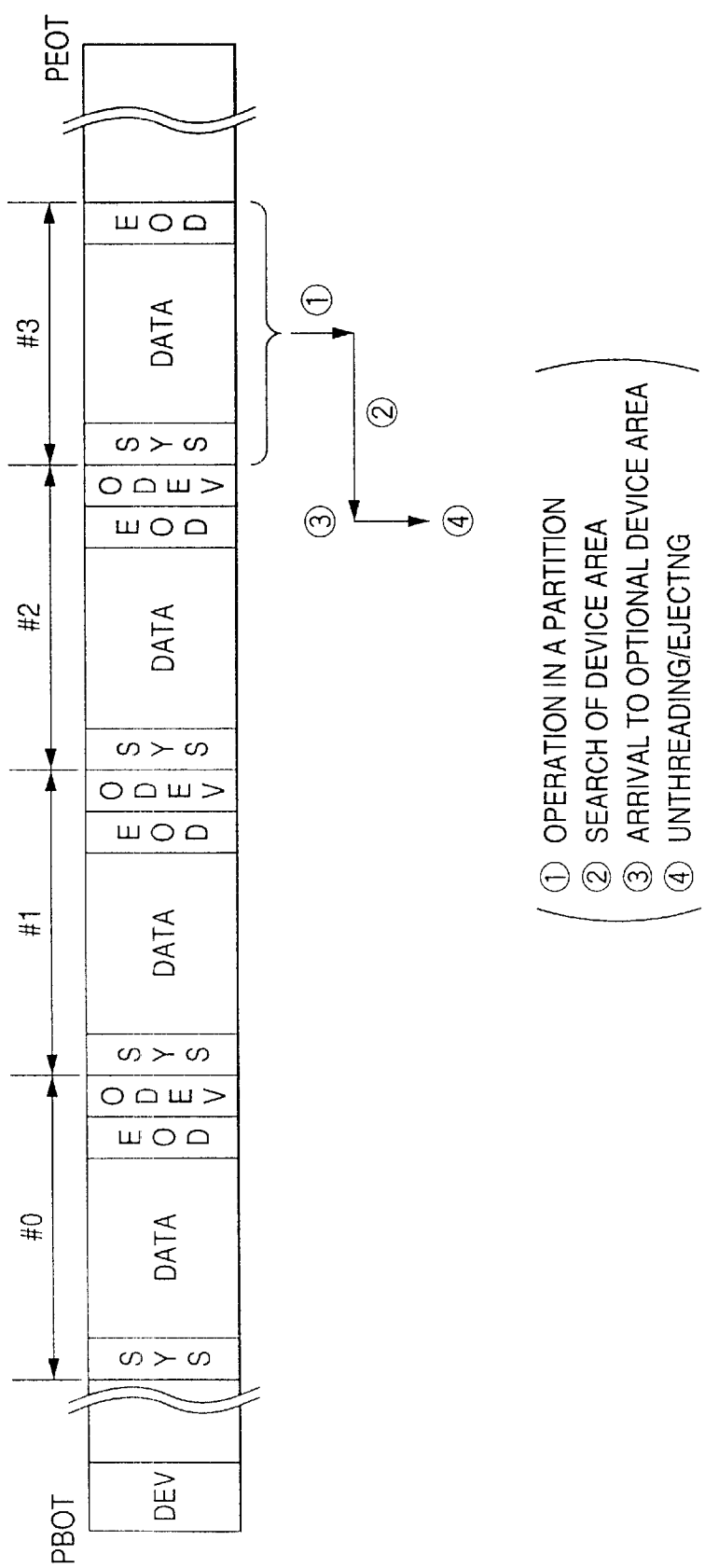
FIG. 21 is a schematic view for explaining transition in the case where unloading is carried out in an optional device area just before a partition.

FIG. 21 is a schematic view for explaining the transition in the case where unloading is carried out in the device area just before the current partition correspondingly to step S003 of FIG. 20. This drawing schematically shows the magnetic tape correspondingly to FIG. 6, and "SYS" designates a system area, "DATA" designates a data area, "DEV" designates a device area, and "ODEV" designates an optional device area. By these areas, for example, four partitions (#0, #1, #2, #3) are formed on the magnetic tape 3.

For example, in the case where execution is made with the partition #3 active, the position of the magnetic tape 3 is some position in the partition #3 as indicated by ①.

Here, on the basis of a user's operation, in the case where eject instructions are supplied from the host computer 40 to the system controller 15, the processing of the system controller proceeds from step S002 to step S003.

First, the system controller 15 gives the servo controller 16 instructions to run the magnetic tape 3 in the reverse direction, and searches the device area of the partition #2. The device area and optional device area are areas set as loading/unloading position as described before. In this case, for example, as shown by ②in FIG. 21, the tape is made to run in the reverse direction.

Thereafter, by search ②, the position reaches the optional device area of the rear end of the partition #2 as shown by ③. The system controller 15 can judges the area of the current running position of the magnetic tape 3 by, for example, reading data of the ID area explained in FIG. 7 to FIG. 10.

After reaching the optional device area, for example, update of various information such as the reel diameter information as the unloading position is carried out to the MIC 4, and the magnetic tape 3 is unthreaded from the rotary drum 11 by the loading motor 14E, and further, the eject motor 28 is driven, so that the tape cassette 1 is ejected as shown by ④.

When the tape cassette 1 having been unloaded as shown in FIG. 21 is again loaded into the tape streaming drive 10, after loading at the optional device area of the partition #2, on the basis of information such as eject status, the tape moves to the system area of the partition #3 close to the optional device area, and is put in a standby state.

Figure 22A:
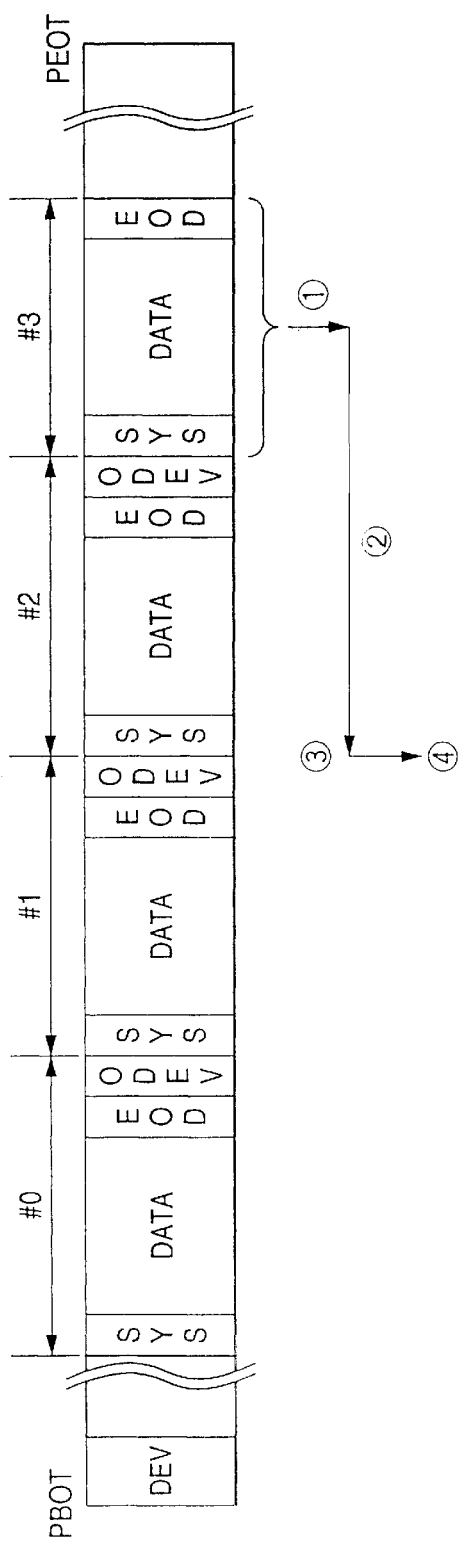
FIGS. 22A and 22B are schematic views for explaining transition in the case where unloading is carried out in a device area or an optional device area pointed by a load pointer.
Figure 22B:
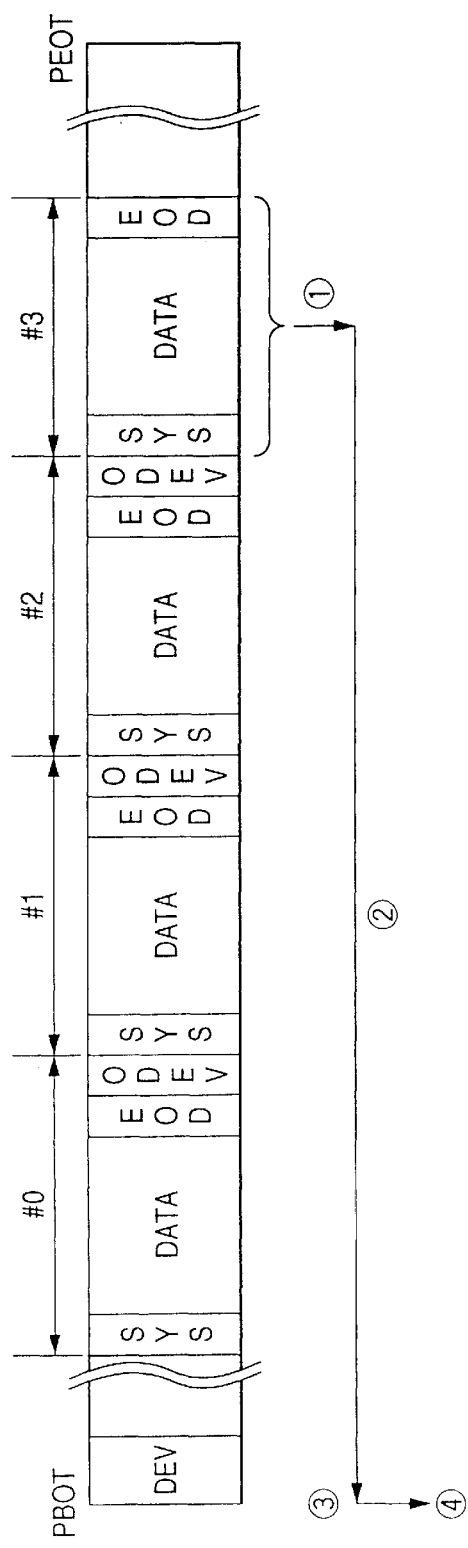

FIGS. 22A and 22B are schematic views for explaining the transition of the case where unloading is carried out in the device area of the partition specified by the load point FL311a correspondingly to step S006. FIG. 22A shows an example of the case where unloading processing and ejection are carried out, for example, in the optional device area formed in the vicinity of the physical center portion of the magnetic tape 3 in the longitudinal direction.

In the example shown in FIG. 22A, unloading is carried out, for example, in the optional device area of the partition #1 formed at the center portion of the magnetic tape. Thus, a value corresponding to "#2" is set as the partition number in the load point FL311a.

For example, in the case where the partition #3 is executed as active, and in the case where eject instructions are supplied from the host computer 40 to the system controller 15 on the basis of the user's operation, processing of the system controller 15 proceeds from step S002 to step S006.

In this case, the system controller 15 gives instructions to the servo controller 16 to run the magnetic tape 3 in the reverse direction, so that the tape is run, for example, in the reverse direction as shown by ②.

Thereafter, by search ②, the position reaches the optional device area (#1) of the rear end of the partition #1 as shown by ③.

After reaching the optional device area (#1), information of unloading position is updated to the MIC 4. Then, unloading processing is carried out, and the magnetic tape 3 is unthreaded from the rotary drum 11 by the loading motor 14E, and further, the eject motor 28 is driven, so that the tape cassette 1 is ejected as shown by ④.

Like this, in the example shown in the drawing, the load point FL311a is set as, for example, "#2", so that unloading is carried out at the optional device area (#1) formed at the almost center portion of the magnetic tape 3.

That is, when the tape cassette 1 having been unloaded as shown in FIG. 22A is again loaded into the tape streaming drive 10, after loaded at the optional device area (#1), the cassette is put in a standby state in the system area of the partition #2 close to the optional device area (#1).

Thus, access efficiency to the partition #2 or #3 is improved as compared with the case where the position is located at the leading portion of the magnetic tape.

Incidentally, although it takes a time to access, for example, the partition #0, an average access time to the respective partitions can be shortened.

In FIG. 22A, although the example in which the partition #3 is operated is shown, even in the case where the partition #0, #1, or #2 is operated, unloading processing and ejection are carried out in the optional device area #1. The search ② in this case is carried out by the operation in the forward direction with respect to the partition #0 or #1, and the operation in the reverse direction with respect to the partition #2 like the partition #3.

In the case where unloading is carried out in the device area formed in the vicinity of the leading portion of the magnetic tape, it becomes as shown in FIG. 22B. In the example shown in FIG. 22B, since unloading is carried out, for example, in the device area of the leading portion of the magnetic tape, a value corresponding to the partition number "#0" is set in the load pointer FL311a.

As shown in the drawing, for example, in the case where the partition #3 is made active and execution is made, when eject instructions are supplied from the host computer 40 on the basis of the user's operation, the system controller 15 gives instructions to the servo controller 16 to run the magnetic tape in the reverse direction, so that the tape is made to run, for example, in the reverse direction as shown by ②.

Thereafter, through search ②, the position reaches the device area of the leading portion of the magnetic tape 3 as shown by ③. In the case where search of such a long interval is carried out, high speed search by motor rotation information based on the FG pulse may be carried out.

After reaching the device area, unloading processing is carried out, and the magnetic tape 3 is unthreaded from the rotary drum 11 by the loading motor 14E, and further, the eject motor 28 is driven, so that the tape cassette 1 is ejected as shown by ④.

Like this, in the example shown in the drawing, the load point FL311a is set, for example, as "#0", so that unloading is carried out in the state where all the magnetic tape 3 is rewound.

Thus, in the case where the tape cassette 1 is kept for a long period of time in the state where it is ejected from the tape streaming drive 10, the recording surface of the magnetic tape can be made unexposed. Accordingly, it becomes possible to suppress deterioration of the tape due to moisture etc.

As the position where unloading is carried out, it is sufficient if the position is made to be the device area or optional device area serving as an eject management area. Unloading can be made at portions other than the center portion or the leading portion of the magnetic tape as explained in FIGS. 21A and 21B.

Further, as the load point FL311a, although the example in which the value corresponding to the partition number is set has been described, the device area or optional device may be shown.

What is claimed is:

1. A tape driving apparatus, comprising:

tape drive means for running a magnetic tape when a tape cassette housing said magnetic tape is loaded therein and for recording or reproducing information with respect to said magnetic tape;

loading means for loading said tape cassette into said tape drive means and for ejecting said tape cassette from said tape drive means;

memory drive means for use where a memory to record management information for managing recording or reproduction with respect to said magnetic tape for reading or writing said management information with respect to said memory;

ejection information detecting means for detecting from said memory predetermined ejection position information specifying one of a plurality of ejection management areas formed on said magnetic tape; and control means for controlling said tape drive means so that when said tape cassette is ejected said magnetic tape is moved to a specific ejection management area of said plurality of ejection management areas based on said predetermined ejection position information detected by said ejection information detecting means, and for controlling said loading means so that said tape cassette is ejected when said magnetic tape is moved to said specific ejection management area.

2. The tape driving apparatus according to claim 1, wherein said control means performs controlling such that said tape cassette is ejected in said ejection management area formed near a physical center portion of the magnetic tape in a longitudinal direction based on said ejection position information.

3. The tape driving apparatus according to claim 1, wherein said control means performs controlling such that said tape cassette is ejected in said ejection management area formed near a leading portion of said magnetic tape based on said ejection position information.

4. A recording medium comprising:

a tape cassette housing a magnetic tape; and a memory provided in said tape cassette and recording management information for managing recording or reproduction with respect to said magnetic tape, wherein said magnetic tape includes a plurality of ejection management areas, and said memory stores predetermined ejection position information to indicate a specific ejection management area among said plurality of ejection management areas.

5. The recording medium according to claim 4, wherein said ejection position information indicates an ejection management area formed nearest to a physical center portion of said magnetic tape in a longitudinal direction.

6. The recording medium according to claim 4, wherein said ejection position information indicates an ejection management area formed near a lead portion of said magnetic tape.

* * * * *